United States Patent [19]

Wistreich et al.

[11] 3,875,314

[45] Apr. 1, 1975

[54] LIQUID SMOKE AND METHOD FOR MANUFACTURE

[75] Inventors: Hugo E. Wistreich; Hyunil Juhn, both of Chicago, Ill.

[73] Assignee: B. Heller & Company, Chicago, Ill.

[22] Filed: Jan. 31, 1973

[21] Appl. No.: 328,418

[52] U.S. Cl.............. 426/342, 426/221, 426/224, 426/369, 426/431
[51] Int. Cl............................................. A23b 1/04
[58] Field of Search .......... 426/148, 224, 314, 315, 426/373, 379, 221, 377, 431

[56] References Cited
UNITED STATES PATENTS

| | | | |
|---|---|---|---|
| 3,117,007 | 1/1964 | Hollenbeck | 426/314 |
| 3,523,802 | 8/1970 | Wandel et al | 426/224 |

*Primary Examiner*—Raymond N. Jones
*Assistant Examiner*—R. A. Yoncoskie

[57] ABSTRACT

Preparation of a liquid smoke by subjecting wood particles to carbonization temperature in a carbonizing atmosphere after the wood particles have been treated with up to 100 percent of their weight with an acetic acid solution on which the acetic acid is present in a concentration of between 10–50 percent by weight and subjecting the vapors and smoke which are generated from the wood to extraction in aqueous medium, preferably at an elevated temperature above 20°C but below the boiling point temperature for the aqueous medium and preferably at a temperature within the range of 25°–75°C with the recycle of a portion of the condensate to expose the smoke and vapors to a solution thereof in the aqueous medium for extraction.

16 Claims, 1 Drawing Figure

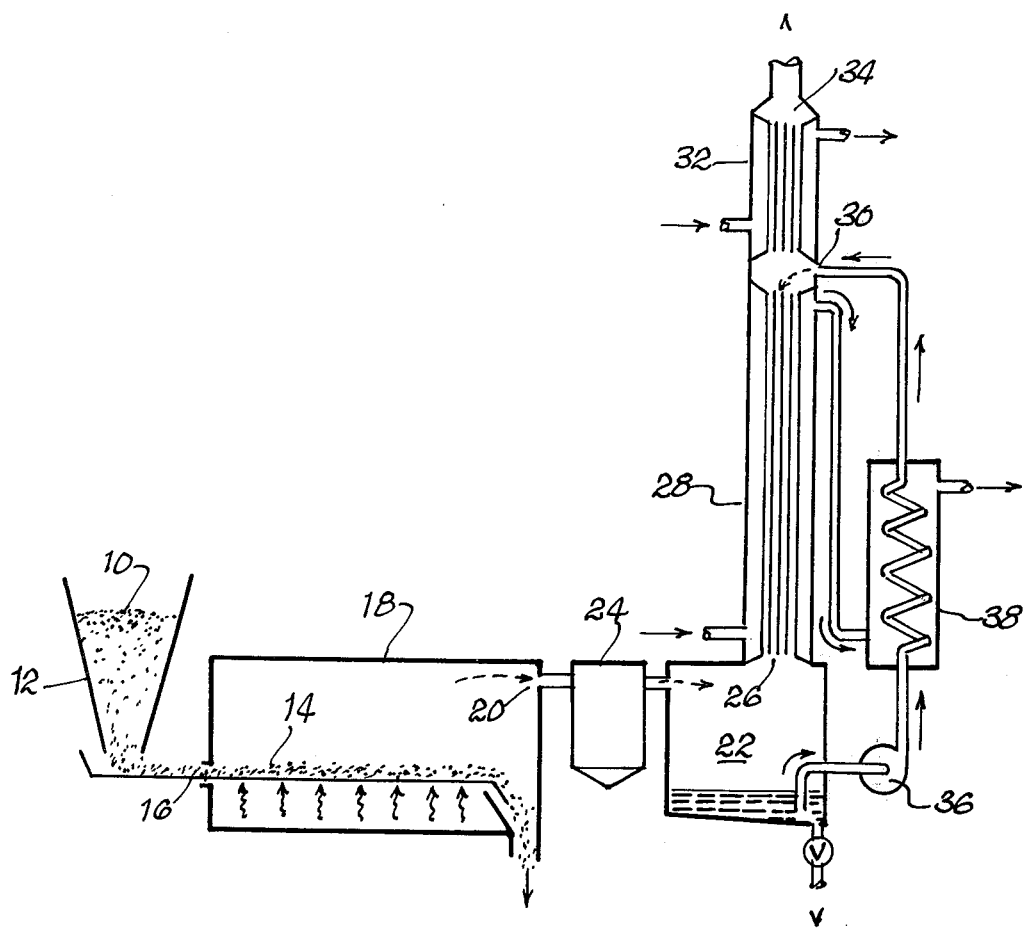

LIQUID SMOKE AND METHOD FOR MANUFACTURE

This invention relates to the preparation of a liquid smoke for use to impart a smoky flavor and taste to food products and it relates more particularly to a method and apparatus for the production of such liquid smoke.

Liquid smoke has heretofore been made available for use in the production of smoked food products or other products having a smoky taste, such as cheeses, fish and the like. Such liquid smoke has been produced by passing smoke into contacting relation with aqueous medium. The smoke is extracted by condensation or absorption in the aqueous medium followed by concentration of the resulting solution to increase the smoke content therein. The smoke is generated in the normal manner by partial combustion of hard wood but, instead of exposing the food product to the smoke particles and vapors, the smoke is taken up by the aqueous medium for subsequent use.

This enables the smoke to be produced at one station for more efficient utilization of raw materials and to be utilized at distant stations without the need for operation of smoke generating equipment therewith.

The liquid smoke can be employed in a number of ways in the treatment of food products therewith. In one procedure, the food product is dipped in the liquid smoke either to coat the surfaces of the food product with the liquid smoke and/or to permit the liquid smoke to penetrate in desired amounts into the food product, after which the food product is heated to elevated temperature to release the smoke while the food product is at elevated temperature.

In another system, which has been employed commercially, the food product is advanced through a heated space, while the liquid smoke is sprayed onto the surfaces of the food product, during or preferably immediately prior to exposure to elevated curing temperature.

In a more recently developed commercial process, the smoke vapors are regenerated by heating small particles of liquid smoke to elevated temperature to regenerate the smoke vapors by evaporation of the liquid. The food products are exposed to the regenerated smoke particles while being heated within a confined space to produce a smoked food product.

It will be obvious from the foregoing that, with liquid smoke, the food product can be smoked at stations separate and apart from the station at which the smoke is generated. The degree of smoking and cure can be more accurately controlled for greater uniformity of product by being able to adopt optimum conditions which can be maintained from batch to batch, thereby to be able to standardize on the quality and taste of the smoked food product.

Separation of the smoking process from smoke generation permits the smoking to be carried out as a unit operation, mass production, or as a continuous operation thereby to enable the production of a more desirable product at lower cost.

There are a number of other distinct advantages and improvements which flow from the possible use of smoke in liquid form, such as the production of small scale or home units for smoking food and other products; combining different flavors and ingredients or vapors for incorporation into the food product as an incidence to the smoking operation, thereby to enable the production of food products of better taste, better texture, better appearance, or the like.

To the present, such liquid smoke has depended upon condensation or extraction of smoke vapor from smoke generated in the normal manner by the partial combustion of hard wood. Absorption or extraction of the smoke particles or other vapors present in the smoke is not complete with the result that the recovery of smoke in the liquid is low by comparison with the amount of smoke that is generated. This means that more liquid smoke is required to be used in the production of smoked food products, with corresponding increase in cost.

It is an object of this invention to produce and to provide a method and apparatus for the production of liquid smoke in which more of the vapors and particles of the generated smoke is recovered; in which such liquid smoke can be produced in higher concentrations and at lower cost; in which the conditions for smoke generation and recovery can be controlled to produce liquid smoke of different compositions for selected utilization in producing smoked products, depending upon the color, taste, and texture desired and the material being smoked.

These and other objects and advantages of this invention will hereinafter appear and for purposes of illustration, but not of limitation, an embodiment of the invention is shown in FIG. 1 which is a schematic flow diagram for the production of liquid smoke in accordance with the practice of this invention and illustrating the arrangement of apparatus for use in same.

The invention will hereinafter be described with reference to the flow diagram. However, it will be understood that other arrangements of apparatus and procedural steps can be employed without departing from the concept of the invention, as hereinafter described.

Hard wood, in finely divided particulate form, such as sawdust 10, is fed continuously from a hopper 12 to form a layer 14 on a metal plate 16, in the form of a vibratory conveyor for advancement of the particulate material through an enclosed space 18 heated to a temperature sufficient to cause thermal destruction or degradation of the wood particles. For this purpose, the bottom side of the plate 16 is heated, directly or indirectly, as by a flame, to elevated temperature of about 600° to 750°C for transmission of heat sufficient to cause carbonization of the wood particles during the period of time for passage of the wood particles thereover from the feed end to the delivery end 20, after which the burned or charred wood particles fall from the conveyor for disposal, and preferably for use as a charcoal byproduct.

Prior to exposure of the wood particles to combustion temperature, the wood particles are treated with 20% by weight thereof of a 20 percent aqueous solution of acetic acid. The fumes, vapors and smoke particles which are given off by the thermal reduction of the wetted wood particles to the charred state are exhausted from the chamber 18 through an outlet 20 for passage into a condensate chamber 22. The outlet 20 communicates with the upper vapor zone of the enclosed heating chamber 18.

While it is not essential, it is desirable to effect removal of tars and solid particles from the exhaust before entrance into the condensate chamber 22. For this purpose, a trap 24 is provided intermediate the heating chamber 18 and the condensate chamber 22 through which the exhaust is processed to enable the heavy condensate, tars and solids to drop out of the exhaust stream.

The contact tower is built in such a way that several smaller tubings are placed in a large tubing forming water jacket so that temperature regulated water is flowing from bottom inlet to upper outlet of the jacket. This is to control the temperature inside the smaller tubings which are packed with contact members such as Raschig rings, ceramic saddles or other contact surfaces for maximizing contact between a liquid flowing in one direction and the exhaust flowing countercurrently therethrough for extraction of components from the exhaust into the extraction liquid.

The condensate which is collected in the condensate chamber 22 or condensed from the exhaust at the condenser placed above the contact tower is introduced through an inlet 30 in the upper portion of the contact tower for flow downwardly in countercurrent flow with the exhaust gases and vapors which pass upwardly through the tower.

The aqueous condensate which flows downwardly through the tower 28 and through the opening 26 into the condensate chamber 22 is collected in the condensate chamber for removal as product, or for recycling.

By way of modification to enhance the yield of materials extracted from the exhaust passed upwardly through the contact tower 28, it is desirous to pass the gaseous effluent from the contact tower through a water cooled condenser 32 operating at a temperature below the temperature prevailing in the contact tower to effect further removal of materials which can be condensed to the liquid state at such lower temperature and to return such condensate with the aqueous medium to the inlet at the upper end of the contact tower for flow gravitationally downwardly therethrough. For this purpose, it is desirable to mount the condenser 32 in communication with, and preferably at the top of, the contact tower, for continuous flow of vapors and gases exhausted from the top of the contact tower to the inlet at the bottom of the condenser. The uncondensed gaseous material is exhausted from an outlet 34 at the top of the condenser.

The recovery of aqueous condensate containing an increased amount of extractables from the exhaust is achieved by recycling all or part, such as 10-90 percent and preferably 30-80 percent, of the condensate to the inlet at the upper end portion of the contact tower for flow downwardly through the tower in countercurrent flow with the gaseous exhaust stream, and by regulating the temperature of the water jacket at a temperature range of 15°C to 90°C, and preferably 25°C to 70°C.

The temperature in the packed column can be controlled by means of the recycled condensate by passage of the condensate from the outlet 24 through a pump 36 to an inlet of a heat exchanger 38 and from the outlet of the heat exchanger to the inlet at the top of the contact tower for passage downwardly through the tower in countercurrent flow with the exhaust gases. The recycle is heated to the desired elevated temperature (which is approximately the same as that of the water jacket of the contact tower) during passage through tubing in the heat exchanger.

By reason of the recycle of the condensate at elevated temperature, the amount of material extracted from the exhaust gases is increased per unit volume of liquid thereby to increase the concentration of extractable materials in the condensate which is collected at the bottom of the contact tower.

The effect of recycle and extraction at elevated temperature on the quality and character of the condensate obtained as a product will hereinafter be described as an important concept of this invention.

Returning now to the described mode of operation of the invention, the amount of aqueous medium with which the wood particles or sawdust can be treated can range from 10 percent by weight up to 100 percent by weight, based upon the weight of the wood particles, without interfering with the free flow of the particles for uniform heating during passage through the heating chamber 18. It is preferred to treat the wood particles with 10-50 percent of its weight with the aqueous medium and more preferably with 20-40 percent of its weight.

Within the amounts described above, use can be made of an aqueous medium containing 10-50 percent by weight of acetic acid and preferably 15-40 percent by weight of acetic acid. When the amount is less than 10 percent by weight and the minimum amount of aqueous medium is applied, the amount of acetic acid present with the wood particles is insufficient to impart the desirable effects. On the other hand, when the concentration of acetic acid in the aqueous medium exceeds 50 percent by weight at the higher levels of aqueous medium additions to the wood particles, the odor of acetic acid is discernible in the condensate collected as product and is traceable to the food products smoked therewith. It has been found that the use of aqueous solutions in amounts to provide higher proportions of acetic acid yields condensates which are darker in color and which produce a smoked product having a desirable dark brown appearance by comparison with use of acetic acid concentrations at the lower levels.

Generation of smoke from the wood particles treated with acetic acid solution can be achieved by heating the wood particles directly by passage over a hot plate heated to elevated temperatures, such as 600°C or more, but it can also be achieved by indirect heating by passage with the desired exposure through an enclosed space heated to elevated temperature sufficient to effect charring of the wood particles, or use can be made of both direct and indirect heating.

It is desirable to maintain an atmosphere within the heating chamber 18 in which oxygen is insufficient to cause combustion of the wood particles while heated to elevated temperature. While it is desirable to maintain an inert, non-combustible atmosphere within the enclosed heated space, benefit is derived from the standpoint of the rate and uniformity of heating and in the amount of smoke generated, after a small amount of air is allowed to pass through the chamber for carrying off the exhaust, but again the amount should be insufficient to permit combustion of the treated wood particles.

An important concept of this invention resides in the discovery that when the wood particles are treated, prior to heating, with an aqueous solution containing acetic acid, the liquid smoke that is collected as condensate can be used in lesser amounts by comparison to the liquid smoke collected by extraction from the exhaust of untreated wood particles, without loss of the smoky taste or appearance in the food product that is produced and/or a smoked product of improved quality and appearance can be secured when use is made of equivalent amounts. It has been found further that the color or appearance of the smoked food product can be adjusted depending upon the amount of acetic acid incorporated in the wood particles prior to limited burning and/or by regulating the contact temperature during recycling of the condensate to enable smoked food products of improved appearance and taste to be produced. Another significant improvement derived from the practice of this invention resides in the greater uniformity in the character and composition of the liquid smoke that is secured thereby to enable greater uniformity in smoked products produced from batch to batch.

Having set forth the basic concepts of this invention, description will now be made of specific experiments for establishing the parameters in the production of liquid smoke representative of the preferred practice of this invention.

EXAMPLE 1

The experiments were carried out with sawdust processed in the apparatus previously described and heated at temperatures sufficient for destructive distillation (600°C to 650°C hot plate temperature) in insufficient air in a chamber in which the temperature immediately above the smoldering sawdust particles was 200°–250°C and with the temperature in the extraction chamber 28 at approximately 25°C.

The temperature in the extraction zone, through which the exhaust gases were passed prior to the condensation zone 32, was found to have a material effect on the amount of material extracted from the exhaust, especially when measured from the standpoint of the phenol content.

For this experiment, the sawdust was treated with 20 percent by weight of a 20 percent by weight acetic acid solution and heated to smoldering temperature in the apparatus described in a deficiency of air. The recycle through the heat exchanger 38 to the contact tower 28 was heated to various temperatures to provide for extraction temperatures in the chamber of 25°C, 40°–45°C and 70°–80°C.

Comparison was made with liquid smoke marketed by B. Heller & Company under the trade name C-10, produced by extraction in water of smoke generated from wood sawdust without pre-treatment with acetic acid solution. The results are set forth in the following table:

| Extracting Temperature | % acidity | phenols mg/ml |
|---|---|---|
| 25°C | 11.0 | 12.4 |
| 40–45°C | 12.6 | 16.0 |
| 70–80°C | 14.6 | 21.0 |
| C-10 | 11.1 | 12.2 |

It will be seen that the concentration of material extracted from the smoke increases rapidly with increase in extraction temperature. This is believed to result in part from the fact that material in the exhaust becomes increasingly soluble as the concentration of soluble increase in the extraction solution and that materials in the exhaust become increasingly soluble at elevated extraction temperature. Recycle at 25°C gives condensates equivalent to conventional material while the amount of extract increases materially with increase in extraction temperature from 25°C to 40°–45°C and from 40°–45°C to 70°–80°C. This indicates that more material is extracted from the exhausted gases into the concentrate and that materials which otherwise are not extractable at lower temperature and/or at lower concentration, are extracted at such higher temperatures and/or at such higher concentrations of material in the extraction solution.

The results from a laboratory taste panel showed that condensate extracted at 70°–80°C possessed the most desirable smoky flavor whereas that from 25°C and 40°–45°C were slightly acidic when they were mixed to Kraft's Velveeta cheese at a level of approximately 0.3 percent by weight.

If will be understood that changes may be made in the details of construction, arrangement and operation without departing from the spirit of the invention, especially as defined in the following claims.

We claim:

1. In the preparation of liquid smoke, the steps of treating wood particles with acetic acid uniformly to distribute the acetic acid throughout the wood particles, heating the wood particles to a carbonization temperature in a carbonizing atmosphere, to reduce the treated wood particles with the corresponding generation of an exhaust containing smoke particles and vapors, and then subjecting the exhaust to an extraction with aqueous medium for the removal of smoke particles and vapors.

2. The preparation of liquid smoke as claimed in claim 1 in which the wood particles are treated with 10–100 percent by weight of an acetic acid solution containing 10–50 percent by weight of acetic acid.

3. The preparation of liquid smoke as claimed in claim 2 in which the acetic acid solution is used in the wood treatment in an amount within the range of 10–50 percent by weight of the wood.

4. The preparation of liquid smoke as claimed in claim 2 in which the acetic acid solution is used in the wood treatment in an amount within the range of 20–40 percent by weight of the wood.

5. The preparation of liquid smoke as claimed in claim 1 in which the acetic acid solution contains 15–40 percent by weight of acetic acid.

6. The preparation of liquid smoke as claimed in claim 1 which includes the step of removing tars and solids from the exhaust prior to subjecting the exhaust to the extraction step.

7. The preparation of liquid smoke as claimed in claim 1 in which the exhaust is subjected to countercurrent flow with aqueous condensate through a contact tower for extraction of smoke and vapors from the exhaust.

8. The preparation of liquid smoke as claimed in claim 7 which includes the step of passing the gas effluent from the extraction step through a low temperature condenser to remove condensable vapors and then returning the condensate with the aqueous medium for countercurrent flow with the exhaust.

9. The preparation of a liquid smoke as claimed in claim 7 which includes the step of collecting the aqueous medium with the extract from the exhaust upon passage from the contact tower, and recycling a portion of the condensate back through the contact tower for countercurrent flow with the exhaust.

10. The preparation of liquid smoke as claimed in claim 9 in which 10–90 percent of the collected condensate is recycled to the extraction step.

11. The preparation of liquid smoke as claimed in claim 9 in which 30–80 percent of the collected condensate is recycled to the extraction step.

12. The preparation of liquid smoke as claimed in claim 1 which includes the step of maintaining the temperature of the extraction within the range of above 20°C to below the boiling point temperature for the aqueous medium.

13. The preparation of liquid smoke as claimed in claim 12 in which the temperature of extraction is within the range of 25°–70°C.

14. The preparation of liquid smoke as claimed in claim 12 in which the temperature of extraction is within the range of 25°–45°C.

15. The preparation of liquid smoke as claimed in claim 12 in which the temperature of extraction is maintained by recycling a portion of the aqueous medium extract to the extraction zone and preheating the recycle to the desired elevated temperature.

16. The preparation of liquid smoke as claimed in claim 1 in which the wood particles are added within an enclosed space for degradation in a gaseous stream containing insufficient amount of air for combustion.

* * * * *